United States Patent Office 2,988,864
Patented June 20, 1961

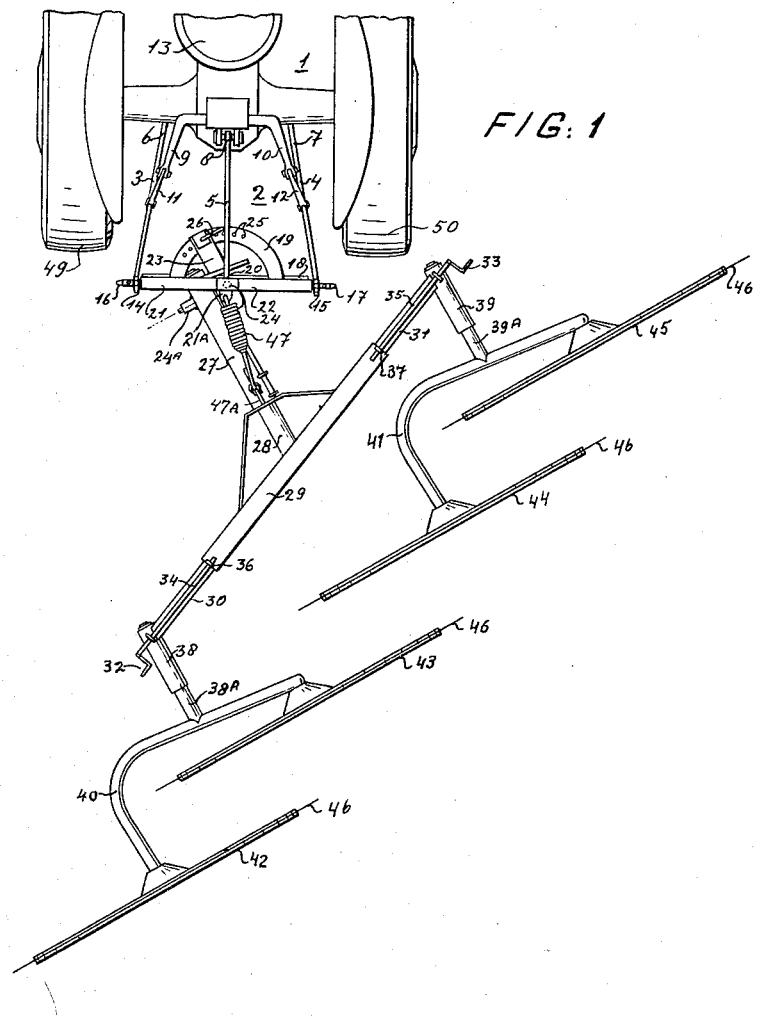

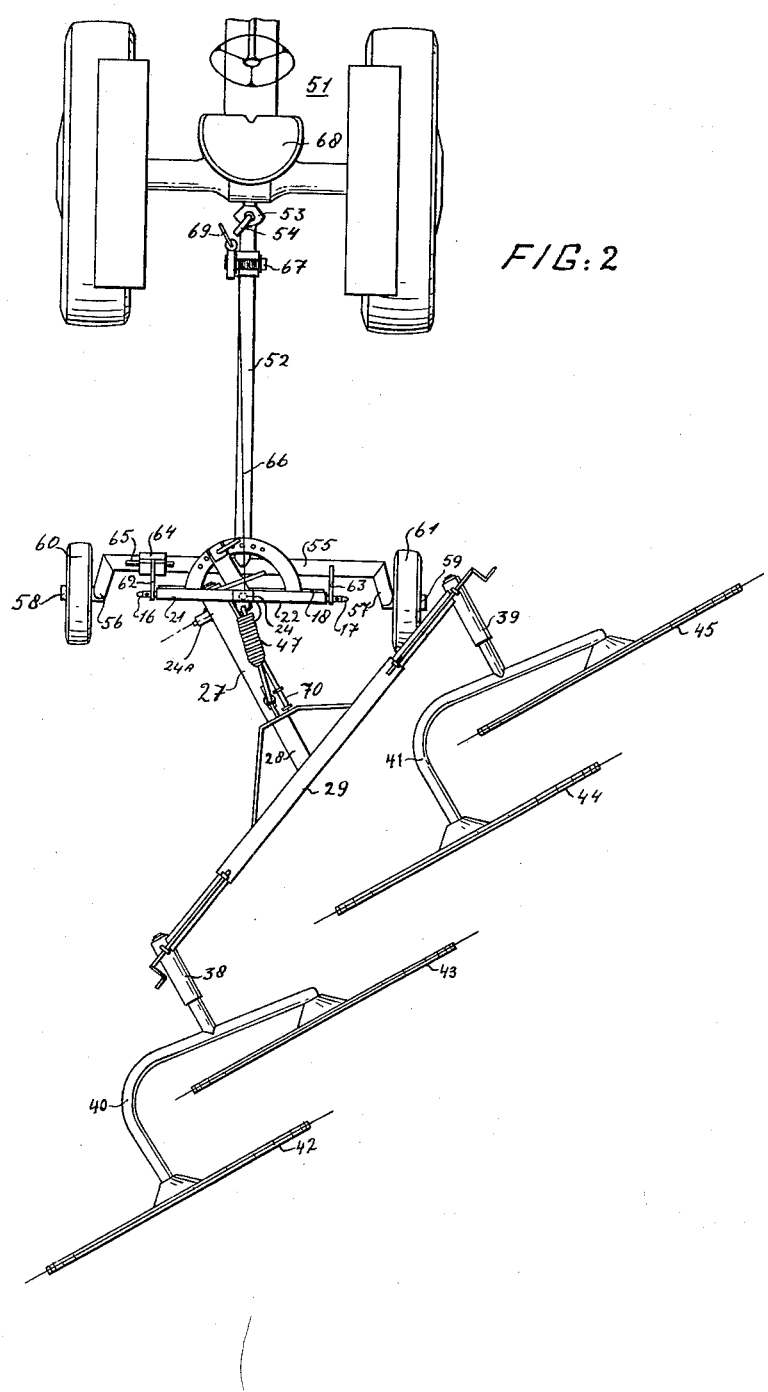

2,988,864
SIDE DELIVERY RAKE WITH AUXILIARY WHEELED HITCH
Cornelis van der Lely and Ary van der Lely, Maasland, Netherlands, assignors to C. van der Lely N.V., Maasland, Netherlands, a Dutch limited-liability company
Filed Nov. 22, 1955, Ser. No. 548,492
Claims priority, application Netherlands Sept. 13, 1955
7 Claims. (Cl. 56—377)

The invention relates to side delivery rakes provided with frames supporting a plurality of overlapping rake wheels. Side delivery rakes are known in which a frame is supported by means of two running wheels situated in front of the rake wheels and wherein running wheels located behind the rake wheels and supporting the frame are lacking. In this known construction, the running wheels are placed obliquely behind one another and thus are in close proximity to the rake wheels. Characteristic of this construction is that, in rounding turns, only one of the running wheels can be given a definite position and the other wheel must be self-adjusting. Disadvantageously, only the running wheel having the definite position can serve for transmitting lateral forces exerted on the frame to the ground and skidding easily occurs when the lateral forces to be transmitted to the ground are great.

It is accordingly an object of the present invention to provide an improved device which will avoid the aforesaid skidding. Another object is to avoid the use of self-adjusting running wheels because at high speeds such running wheels often swing violently giving rise to damage and to very heavy wear of the associated wheel and frame.

According to one embodiment of the invention, in at least one working position of a side delivery rake, the axles of rotation of the running wheels have a definite position relative to the frame portion connecting the bearings of the running wheels and, in said definite position, the axles are in alignment.

It will be apparent that the implement can have one or more working arrangements in which at least one of the running wheels can be disposed at a rather great distance from the associated row of rake wheels. Thus, it may be advantageous to provide a hinge axle about which the frame portion carrying the rake wheels can hinge and which is situated at a considerable distance from the center of gravity of the frame portion carrying the rake wheels. Due to such a provision, the rake wheels are enabled to adapt themselves efficiently to irregularities of the ground traversed.

For the same purpose, it is preferred that the rake be so adapted that the frame portion connecting the bearings of the running wheels constitutes a bridge relative to which the frame portion carrying the rake wheels is rotatable about an axis of rotation passing through or nearly through the center of gravity of the last-mentioned portion.

Furthermore, it is preferred that the frame be drawn from a drawing point located before a line connecting the running wheels and that, seen from above, a connecting line between the drawing point and the center of gravity of the frame intersects the connecting line of the running wheels between both running wheels. Further, in order to obtain sufficient pressure on the running wheels, it will be advantageous to situate the drawing point and the center of gravity at different sides of the connecting line of the running wheels.

Structures and advantages of the invention will be hereinafter more fully described with reference to the accompanying drawings in which two preferred embodiments have been illustrated by way of example and in which:

FIG. 1 is a plan view of a side delivery rake connected with the three-point-hitch of a tractor, FIG. 2 is a plan view of the combination of a side delivery rake and a draw arm, said combination being connected to another tractor.

A part of a tractor 1 is shown in FIG. 1, said part being provided with a three-point-hitch 2 which consists of two arms 3 and 4 situated at the same height and an arm 5 elevated therefrom. The foremost extremities 6, 7 and 8 of arms 3, 4 and 5 are hingedly attached to the tractor 1. If desired by the driver of the tractor 1 sitting on the seat 13, the arms 3 and 4 can be moved up or down by means of cranks 9 and 10 and draw bars 11 and 12 operated by motor power. The hindmost extremities 14 and 15 of the arms 3 and 4 are detachably and hingedly connected to pins 16 and 17 constituting the extremities of a bar 18 to which a semicircular strip 19 is fixedly attached. The hindmost extremity 20 of the arm 5 is connected to the pins 16 and 17 by means of two strips 21 and 22 connected to each other at their upper extremes and extending obliquely downwards. A three-point-hitch on a tractor to which a raking device is connected is known per se from the U.S. Patent 2,621,465.

An arm 23 is rotatable about an axle 24 placed at right angles to the bar 18. The strip 19 is provided with a number of holes 25 and the arm 23 is provided with a locking pin 26 which can be engaged with any of the holes 25 so as to fix the arm in position relative to the bar 18. A tubular member or tube 27 is connected rotatably about a horizontal axle 24A connected with the arm 23. A tubular member or tube 28 is rotatable in said tube 27.

The central part of a frame or beam 29 is fixedly connected to the hindmost portion of the tube 28 at an angle of well over 60°. The beam 29 is hollow and its section is rectangular internally as well as externally. Beams 30 and 31 are inserted slidingly but not rotatably in the opposite extremities of said beam 29.

It is possible to cause the beams 30 and 31 to project as desired from the beam 29 by means of cranks 32 and 33 which control helical spindles 34 and 35 which are threaded in nuts 36 and 37 on beam 29. Tubes 38 and 39 are connected to the beams 30 and 31 and accommodate axles 38A and 39A which are rotatable therein. Curved bars 40 and 41 are fixedly connected to axles 38A and 39A.

Two rake wheels 42 and 43 are rotatably mounted on the bar 40 and two rake wheels 44 and 45 are rotatably mounted on the bar 41. The rake wheels 42–45 have equal diameters and are of one and the same type said wheels being provided at their circumferences with teeth 46.

The upper extremity of the strips 21 and 22 is connected by lug 21A to an extremity of a spring 47 the other extremity of which is connected to lug 47A on the tube 27. Thus, the weight of the beam 29 and the rake wheels is substantially carried by the spring 47. This weight is effectively carried by wheels 49 and 50.

On uneven terrain the beam 29 can move up and down, during which movement the tube 27 rotates about the horizontal axle 24A. The force on the spring 47 which is a resilient device does not change very much in this case. The beam 29 rotates with the tube 28 in the tube 27, whilst the bars 40 and 41 rotate with the axles 38A and 39A in the tubes 38 and 39. Thus, it is assured that all rake wheels rest with substantially the same pressure on the ground even though the ground is not flat under the wheels.

FIG. 2 shows how the same implement can be moved by means of a tractor 51 which is not provided with a hitch. A draw arm 52 is used for coupling the side delivery rake to the tractor 51, said draw arm 52 being at 53 detachably coupled to the tractor 51 by means of a locking pin 54. The arm 52 carries at its hindmost extremity a cross bar 55 the ends 56 and 57 of which extend downwards and carry coaxial axles 58 and 59 for running wheels 60 and 61. The cross bar 55 is provided with a lug 63 and a rib 65 attached thereto, e.g. by welding. A bushing 64 is slidably arranged around the cross bar 55. Rotation of the bushing is prevented by the rib 65. The bushing 64 is provided with a lug 62.

In FIG. 2, the pins 16 and 17 of the rake shown in FIG. 1 are rotatably arranged in the lugs 62 and 63. The arm 52 is provided with a windlass 67. For manual control of the windlass 67 by the driver of the tractor 51 from his seat 68, the windlass is provided with a crank 69. One end of a cable 66 is attached to the upper extremity of the strip 21. The other end of the cable is wound on the windlass 67. By rotation of the crank 69 it is possible to adjust the inclination of the plane comprising the strips 21 and 22 by which inclination the rake wheels 42–45 will rest upon the ground with a controlled pressure because the spring 47 will be controllably stretched.

It is also possible to wind the cable 66 sufficiently on the windlass 67 so that the rake wheels will no longer touch the ground. When the rake wheels 42–45 are raised enough, the tube 28 can be rotated in the tube 27 so that the tube 38 will be lowered after which the tube 28 can be secured against displacement with regard to the tube 27 by means of a locking pin 70 extending between the tubes. In this position the device is prepared for being transported.

It will be apparent that the arrangements according to FIGS. 1 and 2 offer the advantage being the main object of the invention that both running wheels carry the weight of the side delivery rake and being located in front of the rake wheels transmit lateral force to the ground so that the risk of lateral skidding of the rake is substantially non-existant. In FIG. 1 the wheel 49 has a rather great distance to the row of the rake wheels 42–45. In FIG. 2 the wheel 49 has a rather great distance to the row of the rake wheels. In practice a situation may occur temporarily in which at the place of the rake wheels the terrain is considerably lower or higher than at the place of the wheels 49 and 50 in the case of FIG. 1 or at the place of the wheels 60 and 61 in the case of FIG. 2. This could result in bad raking or in damage to the rake wheels. The danger of bad raking and damage is, however, extremely reduced by the fact that the frame of the rake is rotatable about the axle 24A and by the presence of the spring 47. Every inequality of the pressure of the wheels 42–45 on the ground is prevented by the fact that the beam 29 is rotatable about the center line of the tube 27 and that the bars 40 and 41 are rotatable about the center lines of the tubes 38 and 39. It is important to note that due to the regular construction the center of gravity of the entire rake is located in close proximity to the centerline of the tube 28 and not far from the connection between the tube 28 and the beam 29, so that the line from the drawing point 53 to the center of gravity intersects, when seen from above, the connecting line of the axles 58 and 59 not far from a point situated midway between the wheels 60 and 61, and the pressure on the ground of the wheels 60 and 61 therefore cannot become very unequal. Due to said situation of the center of gravity at a considerable distance behind the connecting line of the points where the running wheels 60 and 61 rest upon the ground and because the drawing point 53 and the center of gravity are situated at different sides of said connecting line, the sum of the pressures of the running wheels 60 and 61 on the ground can become much greater than the entire weight of the side delivery rake which is in this light machine highly advantageous for preventing skidding during the exertion of substantial lateral forces.

What we claim is:

1. An agricultural implement comprising a raking device, including a frame and rotary rake wheels thereon, a first draw bar means connected to said frame, a vehicular device including an auxiliary frame and running wheels thereon, connecting means detachably connecting said first draw bar means to said auxiliary frame, said connecting means hingeably connecting said first draw bar means to said auxiliary frame for pivotal movement about a horizontal axis, and a second draw bar means connected to said vehicular device and adapted to be connected to a traction device.

2. An implement as claimed in claim 1, wherein said connecting means comprises horizontal pins connecting the first draw bar means to said auxiliary frame, said second draw bar means including one end connected to said auxiliary frame and a second end adapted to be connected to said traction device; said implement further comprising a vertical pin on said second end for connection to said traction device.

3. An implement as claimed in claim 1 comprising a winch on said second draw bar means and operatively coupled to said first draw bar means to pivot the latter.

4. An implement as claimed in claim 1 wherein said connecting means supports said first draw bar means for pivotal movement abuot a vertical axis.

5. An implement as claimed in claim 1 further including a spring on said connecting means and operatively coupled to said first draw bar means to support at least in part the weight of the first said frame.

6. An implement as claimed in claim 2 comprising a flange fixed on said auxiliary frame and engaging one of said horizontal pins, and a flange slidably supported on said auxiliary frame and detachably engaging the other of said horizontal pins.

7. An implement as claimed in claim 4 comprising locking means operatively associated with said connecting means and with said first draw bar means to fix the latter in position relative to said vertical axis.

References Cited in the file of this patent

UNITED STATES PATENTS

| | | |
|---|---|---|
| 2,265,405 | Strantz | Dec. 9, 1941 |
| 2,476,183 | Fergason | July 12, 1949 |
| 2,597,828 | Spurlin | May 20, 1952 |
| 2,735,256 | West | Feb. 21, 1956 |
| 2,811,009 | Plant | Oct. 29, 1957 |

OTHER REFERENCES

Information Circular No. 4 of the North Carolina Experiment Station (pages 6 and 7), May 1951.